United States Patent [19]

Shaw

[11] 4,114,996
[45] Sep. 19, 1978

[54] INLET GUIDE STRUCTURE FOR ROLLING LOOP FILM TRANSPORT MECHANISM

[75] Inventor: William C. Shaw, Streetsville, Canada

[73] Assignee: Imax Entertainment Limited, Cambridge, Canada

[21] Appl. No.: 775,485

[22] Filed: Mar. 8, 1977

[30] Foreign Application Priority Data

Apr. 2, 1976 [CA] Canada ............................ 249505

[51] Int. Cl.² ............................................. G03B 1/00
[52] U.S. Cl. ...................................... 352/184; 226/39
[58] Field of Search ................... 352/184; 226/4, 59, 226/39, 121

[56] References Cited

U.S. PATENT DOCUMENTS

| 3,494,524 | 2/1970 | Jones | 352/184 |
| 3,600,073 | 8/1971 | Shaw | 352/184 |
| 3,794,415 | 2/1974 | Jones | 352/184 |
| 3,944,349 | 3/1976 | Jones | 352/184 |
| 4,039,256 | 8/1977 | Teeple et al. | 352/184 |

*Primary Examiner*—Monroe H. Hayes
*Attorney, Agent, or Firm*—Rogers, Bereskin & Parr

[57] ABSTRACT

Inlet guide structure is provided having complementary outer and inner guides which are adapted to receive film from a drive sprocket of a rolling loop film transport mechanism and to guide the film inwardly towards a path defined between the stator and the rotor of such a mechanism. The outer and inner guides have respective pairs of co-operating side faces for guiding side portions of the film remote from a centre portion of the film. The side faces of the outer guide define a rounded nose portion intermediate ends of these side faces, and the side faces of the inner guide define a depression corresponding to the nose portion so that when in use the guides combine to form a passage which guides the film by contact between the side faces and the side portions of the film. The nose portion and depression combine to cause the passing film to define a transverse curve about the nose portion, and the passage restrains the film to leave the passage at an acute angle to said path between the stator and the rotor so that an impact by the rotor will start a loop to grow and any tendency for creation of a rigidifying longitudinal bend will be significantly limited because the film is rigidified transversely by the transverse curve about said nose portion.

2 Claims, 12 Drawing Figures

INLET GUIDE STRUCTURE FOR ROLLING LOOP FILM TRANSPORT MECHANISM

This invention relates to an improvement in rolling loop film transport mechanisms of a type used to transport photographic film through a projector, camera or other motion picture apparatus, and more particularly to such a mechanism used to transport large format film.

U.S. Pat. No. 3,494,524 to Jones describes a motion picture apparatus of a type which has become known as a "rolling loop" mechanism. Such a mechanism provides a capability to project large format film (such as 70 mm film) with the images on the film lying side-by-side rather than above one another as was done previously. The height of the image then lies across the film and the width lies along the film. The mechanism is capable of transporting the film so quickly that each image can be proportioned like the image on a television screen. Previous use of 70 mm film required the image to lie with the base of the image across the film and the height was severely limited because of transporting problems. Such use resulted in the wide angle, or curved screens where the height of the projected picture was unacceptably small compared with the width of the picture.

An improvement to the Jones structure is described in U.S. Pat. No. 3,600,073 by the present inventor. This patent teaches some refinements, and notably structure which limits impact with the photographic film to thereby lengthen the life of the film and to make the mechanism more efficient.

One of the features of the structure shown in U.S. Pat. No. 3,600,073 is illustrated in use in a projector. A manifold system diverts air on to the film as a loop starts to grow. The air cushions the impact as a rotor picks up the loop and carries the growing loop towards a projection aperture.

It has been found that a further improvement can be made to enhance the life of the film even further, particularly in a projector. The improvement involves providing a pre-set transverse bend in the film as the film is fed towards the rotor. This transverse bend limits the possibility of the formation of a longitudinal bend which would rigidify the film against formation of the necessary transverse loop.

Accordingly, inlet guide structure is provided having complementary outer and inner guides which are adapted to receive film from a drive sprocket of a rolling loop film transport mechanism and to guide the film inwardly towards a path defined between the stator and the rotor of such a mechanism. The outer and inner guides have respective pairs of co-operating side faces for guiding side portions of the film remote from a centre portion of the film. The side faces of the outer guide define a rounded nose portion intermediate ends of these side faces, and the side faces of the inner guide define a depression corresponding to the nose portion so that when in use the guides combine to form a passage which guides the film by contact between the side faces and the side portions of the film. The nose portion and depression combine to cause the passing film to define a transverse curve about the nose portion, and the passage restrains the film to leave the passage at an acute angle to said path between the stator and the rotor so that an impact by the rotor will start a loop to grow and any tendency for creation of a rigidifying longitudinal bend will be significantly limited because the film is rigidified transversely by the transverse curve about said nose portion.

The invention will be better understood with reference to the drawings in which:

FIGS. 1 to 6 are diagrammatic views of a rolling loop mechanism drawn in sequence to illustrate the principle of operation of the mechanism;

FIG. 7 is a partially sectioned view of a portion of the mechanism described in U.S. Pat. No. 3,600,073 and corresponds to FIG. 18 of this Patent, present FIG. 7 being included to illustrate prior art structure;

Figure 1:
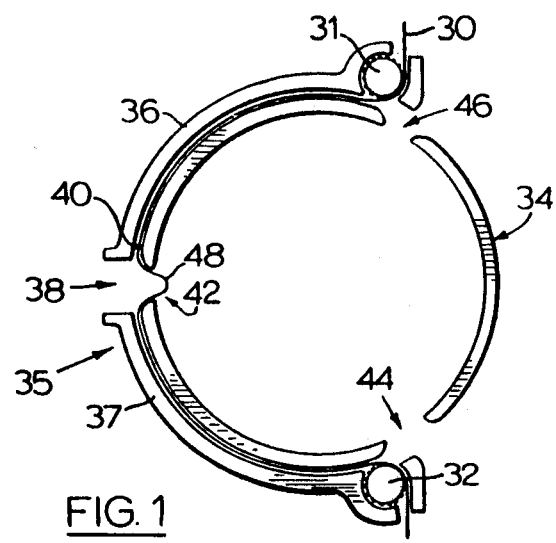
Figure 2:
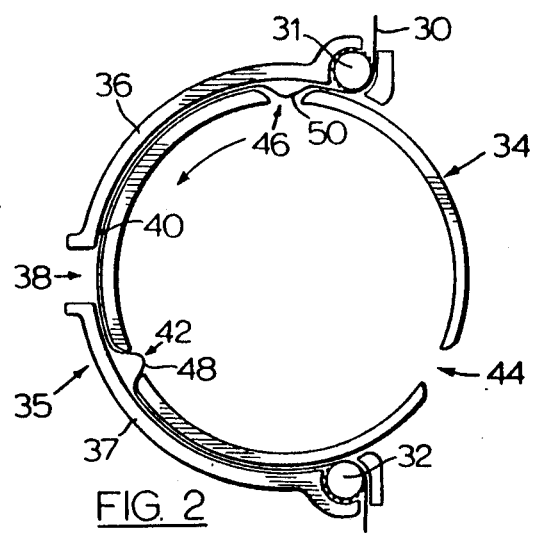

Reference is first made to FIGS. 1 to 6 to describe the principle of operation of a rolling loop film transport mechanism similar to those described by Jones in U.S. Pat. No. 3,494,524 and by Shaw in U.S. Pat. No. 3,600,073. A film 30 is fed into the mechanism at a predetermined rate by a driven inlet sprocket 31 and is drawn from the mechanism by a driven outlet sprocket 32 at the same predetermined rate. An annular rotor 34 is driven at constant speed inside a stator 35 which includes an inlet portion 36 and an outlet portion 37. The portions 36 and 37 are fixed to the mechanism about an aperture 38 with sufficient radial clearance from the rotor 34 for the film 30 to move freely. The film 30 is located by a fixed pin 40 which is attached to the inlet portion 36 adjacent the aperture 38. The rotor has three equally spaced peripheral gaps 42, 44, 46 in which film loops are formed which are moved around the stator 35 by the rotor 34. In the position shown in FIG. 1, a loop 48 in the film 30 is located in the gap 42 opposite the aperture 38. The film is located on the pin 40 so that the portion of the film between the pin 40 and the inlet sprocket 31 is stationary. As the rotor 34 turns, and as the sprockets 31 and 32 continue to transport the film 30, the mechanism moves into the position shown in FIG. 2 in which a loop 48 has decayed somewhat and a new loop 50 is being formed in the gap 46. The film is stationary between the gaps 42 and 46. As the inlet sprocket 31 continues to feed film into the mechanism, the loop 50 grows to take up the excess film. Also, the outlet sprocket 32 continues to draw film out of the mechanism so that the loop 48 decays as the sprocket 32 transports the film.

Figure 3:
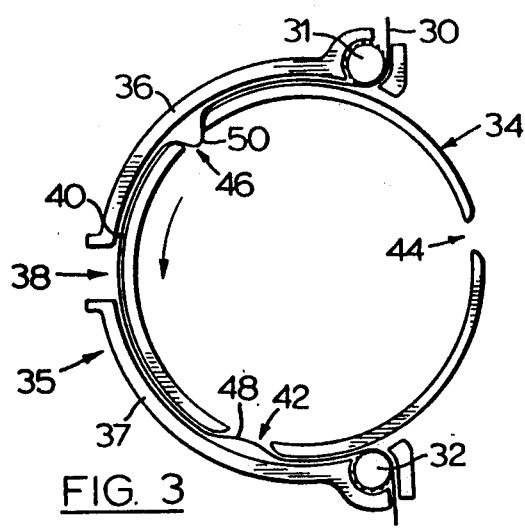
Figure 4:
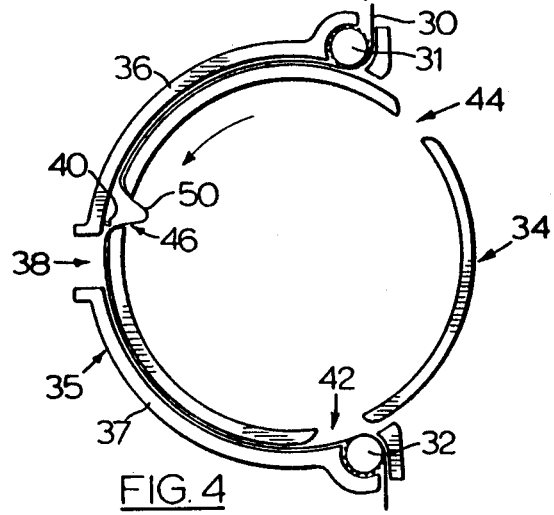
Figure 5:
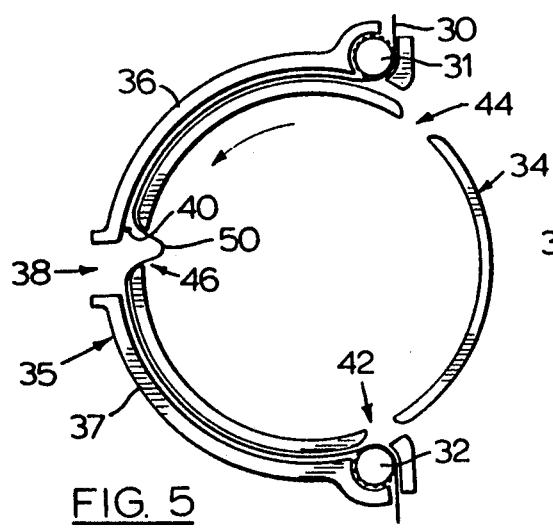
Figure 6:
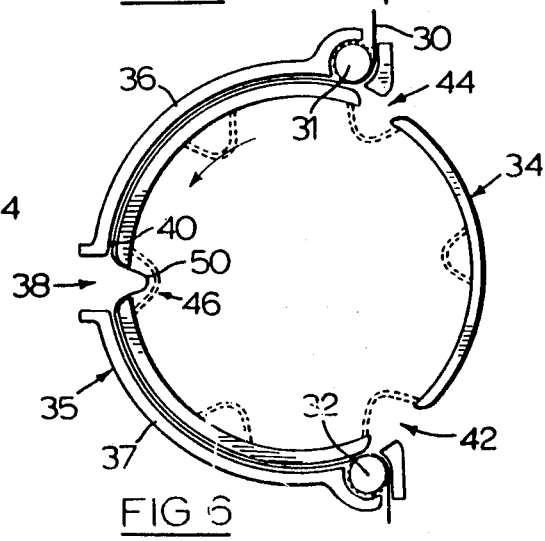

The rotor 34 continues to move and next reaches the position shown in FIG. 3 where the loop 50 is continuing to grow and the loop 48 is decaying. As the loop 50 begins to pass over the pin 40, the film is lifted off the pin 40 so that the film between the loop 50 and the outlet sprocket 32 is free to move. The trailing side of the loop 50 then moves over the pin 40 (as shown in FIGS. 5 and 6) whereupon the film is again located on the pin 40 and the part of the film between the loop 50 and the inlet sprocket 30 is stopped. The gap 46 is then opposite the projection aperture 38.

Excess film in each full loop corresponds to a frame length so that in moving the film off the pin 40 and then re-engaging the pin 40, the film is transported through one frame length. Consequently, the position shown in FIG. 6 is similar to that shown in FIG. 1 but with the film transported through one frame length and the rotor moved through one third of a revolution to bring the gap 46 opposite the aperture 38.

If the mechanism is to be used in a projector, shutters for interrupting illumination at the required frequency can be provided by simply adding covers over each gap to form primary shutters and by placing similar covers mid-way between each pair of gaps to form secondary shutters, as shown in broken outline in FIG. 6. Each frame is projected twice, the two projections being separated by the passing of a secondary shutter which cuts off the light passing through the aperture.

The above description of FIGS. 1 to 6 is intended to illustrate the principle of operation of a transport mechanism involving the use of a rolling loop.

In using the rolling loop, it is essential that the film be handled in such a manner that it can withstand numerous showings in the projector. Applicant's aforementioned U.S. Pat. No. 3,600,073 describes some details of improvements which have been used to improve the efficiency of such a transport mechanism. This patent includes description of a mechanism associated with the locating pin 40 to retard the film and prevent sudden high forces which would otherwise damage the film. Similarly, as the loop is commenced in one of the gaps on the inlet side of the mechanism, an air blast is used to cushion the impact between the rotor and the film leaving the inlet sprocket. The present invention is directed to an improvement in this part of the rolling loop mechanism and for the purposes of improved description, FIG. 18 of U.S. Pat. No. 3,600,073 is reproduced in this description as FIG. 7 with different reference numerals. The figure shows the mechanism in use as part of a projector.

Figure 7:
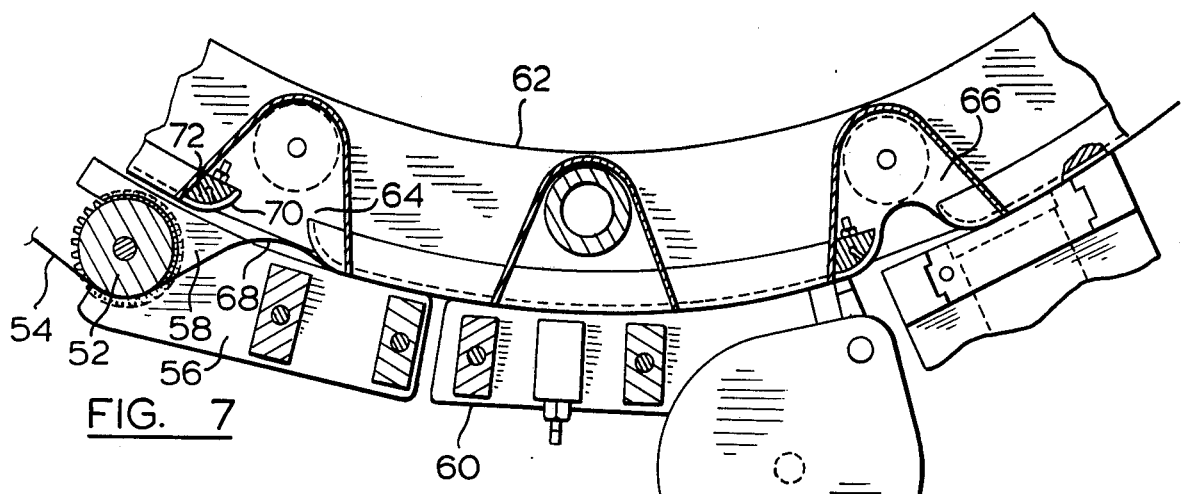

As seen in FIG. 7, an inlet sprocket 52 drives a film 54 between respective outer and inner guides 56, 58 of an inlet portion 60. A rotor 62 is provided to combine with the inlet portion 60 and has gaps such as gaps 64, 66 for containing loops as previously described with reference to FIGS. 1 to 6. Gaps 64 is receiving a growing loop 68 at the trailing side 70 of the gap 64 and includes an air manifold 72 capable of directing an air jet onto the film. The growing loop 68 is picked up and is moved around the inlet portion 60 within the gap 64.

Although it is not evident from FIG. 7, the film is guided by the rotor 62 and stator only at the perforated side portions of the film. The perforations are necessary for combination with the tooth sprocket 52 and other parts of the mechanism. Between the perforated portions, the central portion contains the emulsion or image and it is desirable that this portion should not be in contact with any metallic parts to avoid damage to this portion of the film.

Figure 8:
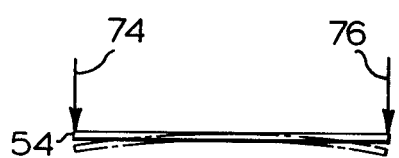
FIGS. 8 and 9 are diagrammatic views of a film and the effects of impacts on the film.

In the absence of the air manifold 72 shown in FIG. 7, the trailing side 70 would impact the film at the perforated side portions of the film without any buffer prior to the impact. The effect of such an impact is illustrated diagrammatically in FIG. 8. The film 54 would be impacted by the trailing side 70 (FIG. 7) in the manner indicated by the arrows 74, 76. Consequently, the film then would tend to bend with a curvature extending longitudinally as indicated in ghost outline. This longitudinal bending effectively rigidifies the film against transverse bending (i.e. at right angles to the curvature shown in FIG. 8). Because the film must bend transversely to form the loop 68, it will be appreciated that in the circumstances described with reference to FIG. 8, the forces creating transverse bending must overcome the rigidity in the film caused by the longitudinal bending. As a result, creasing can occur and eventually the film will no longer be useful.

Figure 9:

FIG. 9 illustrates the effect of using the air manifold 72 described with reference to FIG. 7. This manifold creates a buffer force indicated by the smaller arrows 78. The buffer force tends to ensure that the film does not take the position shown in ghost outline in FIG. 8. However, if the air force is not matched exactly to the film requirements, the buffer force can be sufficiently large that it will cause longitudinal bending of a type indicated in ghost outline in FIG. 9. Consequently, the effect of the air would only improve the situation if the air pressure counteracts the tendency to bend into the ghost outline position of FIG. 8. Any larger force will result in the FIG. 9 ghost outline position. In practice, this is not possible because humidity can change the strength of the film and consequently the force needed from the air could vary daily.

A further approach to the problem has been to use the air manifold 72 and to place a free-moving roller under the film in the outer guide 56. The roller is shaped so that it has outer portions for engaging the film at the perforated side portions of the film, and a central portion of a slightly smaller diameter for engaging the centre portion of the film. The roller is undercut between the centre portion and the side portions so that there is minimum contact between the film and the roller. This centre portion is of a slightly smaller diameter than the side portions so that it will not contact the film unless the air forces the film towards the position indicated in ghost outline in FIG. 9. The movement is then limited by the roller and the longitudinal curvature is kept to a minimum so that the forces created in the film are minimised when the film is moved from a position of longitudinal bending to a position of transverse bend.

Figure 10:
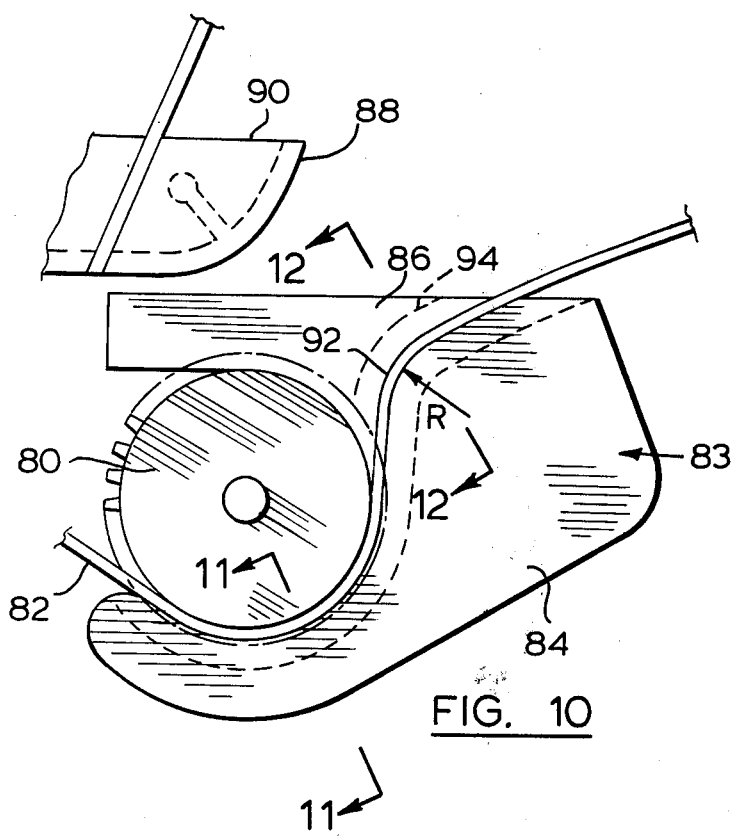
FIG. 10 is a view of inlet guide structure incorporating the present invention.

Reference is now made to FIG. 10 which shows the relevent portion of a film transport device according to the invention. The view can be compared with the left portion of FIG. 7 adjacent the sprocket 52.

As seen in FIG. 10, an inlet sprocket 80 drives a film 82 through an inlet guide structure 83 consisting of an outer guide 84 and an inner guide 86. As before, the rotor includes a trailing side 88 associated with an air manifold 90 for cushioning the blow when the trailing side 88 contacts the film 82.

As the film 82 leaves the inlet sprocket 80, instead of following a substantially straight path corresponding to that shown in FIG. 7, the film is caused to pass a nose portion 92 in contact with the side portions of the film and having a radius R. This portion is formed on the outer guide 84 and the corresponding depression 94 is formed in the inner guide 86 to maintain a constant spacing or passage between the inner and outer guides to accommodate the film 82.

Figure 11:
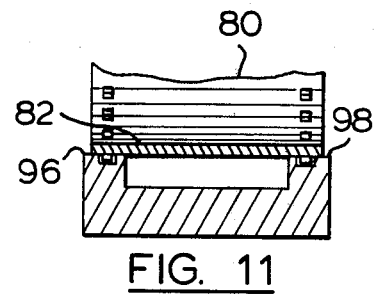
FIG. 11 is a sectional view on lines 11—11 of FIG. 10.
Figure 12:
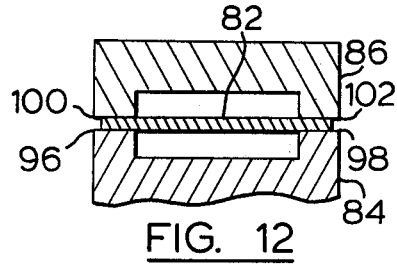
FIG. 12 is a sectional view on lines 12—12 of FIG. 10.

FIGS. 11 and 12 are cross-sections illustrating the shapes of the guides 84, 86 where they contact the film. As seen in FIG. 12, guide 84 defines pairs of side faces 96, 98 which are spaced from complementary side faces 100, 102 by an amount sufficient to provide a passage for the film.

As seen in FIG. 11, the side faces 96, 98 accommodate annular grooves to receive sprocket teeth.

The nose portion 92 of outer guide 84 forms a transverse bend in the film thereby rigidifying the film and limiting the possibility of a longitudinal bend. Consequently, on impact by the rotor, any tendency for a longitudinal bend to be formed is limited due to the increased rigidity of the film caused by the transverse bend at the nose 92. It has been found that the pressure of air used can be substantially reduced relative to previous structures without adversely affecting the performance of the transport mechanism and that the film suffers less from the impact than was the case in prior art structures.

What I claim is:

1. An inlet guide structure having complementary outer and inner guides for receiving photographic film from a drive sprocket of a rolling loop film transport mechanism and for guiding the film inwardly towards a path defined between the stator and the rotor of such a mechanism, the outer and inner guides having respective pairs of co-operating side faces for guiding side portions of the film, the side faces of the outer guide defining a rounded nose portion intermediate ends of these side faces, and the side faces of the inner guide defining a depression corresponding to the nose portion so that when in use the guides combine to form a passage which guides the film by contact between the side faces and the side portions of the film, said nose portion combining with the depression to cause the passing film to define a transverse curve about the nose portion, said passage restraining the film to leave the passage at an acute angle to said path between the stator and the rotor so that on impact by the rotor, a loop will start to grow and any tendency for creation of a rigidifying longitudinal bend will be limited because the film is rigidified transversely by the transverse curve about said nose portion.

2. A film transport mechanism for a motion picture machine in which a film is intermittently transported through a predetermined frame length in relation to an aperture, said film transport mechanism comprising: a stator, a rotor co-operating with said stator to define a path for said film, said rotor having gaps for receiving film loops; an inlet guide structure in said stator through which said film is fed into said path; an outlet in said stator through which said film is withdrawn from said passage, said aperture being intermediate said inlet and said outlet; film moving means for feeding said film into said inlet at a controlled speed relative to the speed of said rotor and for withdrawal of said film from said outlet at said controlled speed; and film locating means for co-operating with said film moving means for gradually increasing and then gradually decreasing said film loop in said gap and for intermittently holding said film in fixed position in registration with said aperture; said inlet guide structure comprising complementary outer and inner guides which are adapted to receive the film and to guide the film inwardly towards the path defined between the stator and the rotor, the outer and inner guides having respective pairs of co-operating side faces for guiding side portions of the film, the side faces of the outer guide defining a rounded nose portion intermediate ends of these side faces, and the side faces of the inner guide defining a depression corresponding to the nose portion so that when in use the guides combine to form a passage which guides the film by contact between the side faces and the side portions of the film, said nose portion combining with the depression to cause the passing film to define a transverse curve about the nose portion, said passage restraining the film to leave the passage at an acute angle to said path between the stator and the rotor so that on impact by the rotor, a loop will start to grow and any tendency for creation of a rigidifying longitudinal bend will be limited because the film is rigidified transversely by the transverse curve about said nose portion.

* * * * *